Patented June 1, 1954

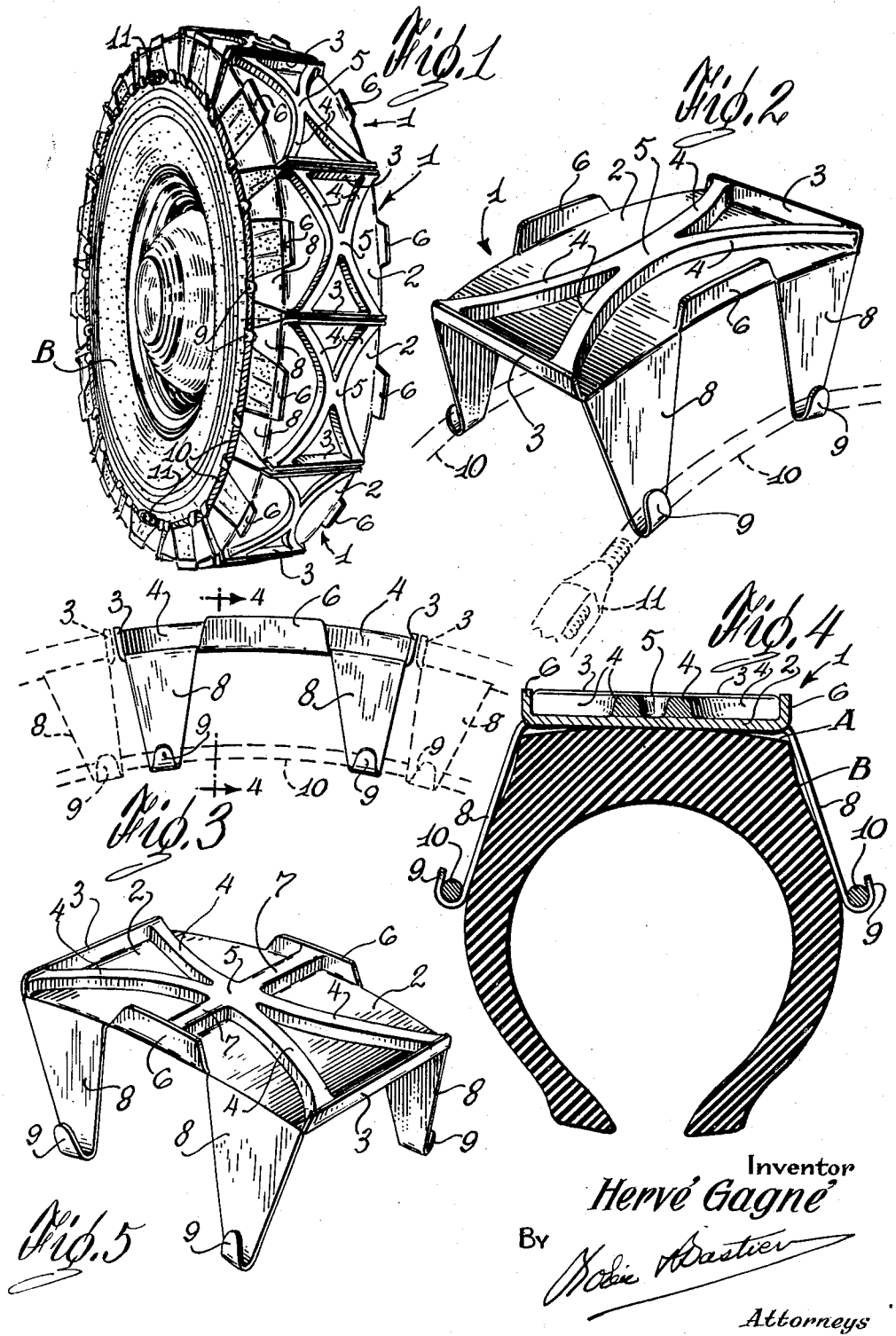

2,679,881

UNITED STATES PATENT OFFICE 2,679,881

NONSKID ATTACHMENT FOR MOTOR VEHICLE TIRES

Hervé Gagné, Grand Bernier, St. Jean, Quebec, Canada, assignor of fifty per cent to Claire Ouimet, Montreal, Quebec, Canada Application December 24, 1951, Serial No. 263,071

4 Claims. (Cl. 152—191)

The present invention relates to nonskid devices and, more particularly, a sectional arrangement of shoes for attachment to the tread surface of motor vehicle tires.

The problem of preventing tire skidding on icy, snowy and slippery roads has so far received much attention on the part of engineers and users alike, many suggestions having been made for its solution.

So far, a simple arrangement of chains secured cross-wise of the tires, at spaced intervals, has been the most generally used anti-skid arrangement. But, said chains have the disadvantage of being noisy, subject to rapid wear and very ineffective on ice, although they are useful in snow and mud.

For improving the performance of chains various modifications have been proposed, in the form of grips or the like, attached on the tires; said grips, however, have the disadvantage of being extremely noisy, prone to heavy vibration and, in some cases, causing bruises or deterioration of the tires.

The present invention has been conceived to avoid the drawbacks noted above and its main object may then be stated to reside in the provision of efficient and improved means for imparting anti-skidding properties to tires on ice and slippery roads.

Another object of the invention is the provision of anti-skidding means for motor vehicle tires which are relatively silent and effective on ice for preventing lateral skidding.

A further object of the invention contemplates a sectional anti-skid attachment which is relatively quiet.

Still another object envisages an attachment of the character described having long life, easily put on and removed from tires, and relatively inexpensive.

Other objects and advantages of the invention will become apparent, or be pointed out further, during the description to follow and by referring to the drawings in which:

Figure 1 is a perspective view of a motor vehicle tire provided with the nonskid attachment according to the invention;

Figure 2 is a perspective view of one shoe according to the invention;

Figure 3 is a side view of the same;

Figure 4 is a cross-section along line 4—4 of Figure 3; and

Figure 5 is a perspective view of a modification of the shoe according to the invention.

Referring now more particularly to the drawings in which like reference characters indicate like elements throughout, the attachment, according to the invention, comprises a plurality of end abutting shoes 1 covering substantially the entire outer ground engaging surface A of the tire B. Each shoe 1 comprises a longitudinally arcuately curved plate 2 having a straight transverse section and from the straight ends of which depend outwardly extending end thrust flanges 3 adapted to abut the end thrust flange of the adjacent shoe 1. Hard steel ribs 4 project outwardly from the surface of the plate 2 being preferably in the form of an arc joined at their opposite middle portion by a bridge 5 so as to define substantially the letter X. Side lips 6 depend outwardly from the central portion of the edges of the plate 2, and according to the embodiment shown in Figure 5, an additional cross-bar 7 joins the side lips 6 to the bridge 5 in order to provide added traction for the shoes 1.

The shoes 1 are provided with depending ears 8 on each side of plate 2 and are preferably formed by bending inwardly an integral extension of said plate 2 provided along its side edges between the lips 6 and the end thrust flanges 3. The outer end of the ears 8 has a U-shape to form a hook 9 for removably engaging a steel cable 10 extending along each side of the tire B and connected by a turnbuckle 11 for tightening said cable 10 and the plates 2 in firm engagement with the outer surface A of the tire B.

As shown in Figure 4, the flanges 3 and lips 6 extend preferably at a level above the outer end face of the ribs 4.

The shoes 1 may be cast in one single operation, or preferably each plate 2 and ear 8 may be struck from a single piece of sheet metal while the ribs 4, flanges 3 and lips 6 may be made of a harder steel and welded to the outer face of the plate 2.

With the arrangement according to the invention, it will be understood that, because the shoes 1 are mutually contacting, any thrust received by the shoe that is engaging the ground at any particular instant, will be transmitted to the others of the series whereby a very strong arrangement is obtained. Furthermore, jumping of the wheels provided with the attachment, according to the invention, is prevented because the entire ground engaging surface of the time B is covered with the shoes 1 contrary to known devices in which ground engaging cleats are provided only at spaced intervals along the periphery of the wheel of the vehicle. The side lips 6 will be particularly effective against lateral skidding while the ribs, and more particularly the flanges 3, will prevent longitudinal slipping; the attachment will increase traction considerably over snow because the shoes I have a straight cross-section as shown in Figure 4, whereby a large contact surface is ensured between the wheel and the snow surface.

When running over ice, the lips 6 and flanges 3 will act as cutting edges for the engaging ice.

While a preferred embodiment according to the invention has been illustrated and described it is understood that various modifications may be resorted to without departing from the spirit and scope of the appended claims.

I claim:

1. A non-skid attachment for vehicle tires including a plurality of substantially rectangular imperforate plates disposed in end abutting relationship, each plate longitudinally arcuately formed to receive the outer portion of the tire, and each plate bent outwardly to provide end thrust flanges at both ends for abutting the end thrust flange of the adjacent plate, longitudinal continuous ribs of a hard metal composition, secured to and outwardly projecting from said plate and connecting and secured to said end thrust flanges, and laterally inwardly extending ears on the sides of said plate and a ring member disposed on each side of said tire concentrically therewith, said ears being attached to said ring members.

2. A non-skid attachment for vehicle tires comprising a plurality of substantially rectangular imperforate plates disposed in end abutting relationship, each plate longitudinally arcuately formed to receive the outer portion of the tire, and each plate bent outwardly to provide end flanges at both ends for abutting the end thrust flange of the adjacent plate, longitudinal continuous ribs of a hard metal composition, secured to and outwardly projecting from said plate and connecting and secured to said end thrust flanges, each plate being bent to provide a pair of lateral inwardly extending ears on each side of said plate, and side lips outwardly extending from the side edges of said plate between said ears, and a ring member disposed on each side of said tire concentrically therewith, said ears being attached to said ring members.

3. A non-skid attachment for motor vehicle tires comprising a plurality of elongated imperforate metal plate member disposed in end abutting relationship, each plate member longitudinally arcuately formed to receive the outer portion of said tire and each plate comprising end thrust flanges extending outwardly therefrom for abutting the end thrust flange of the adjacent plate members, longitudinal continuous ribs of a metal composition harder than the metal of said plate member, secured to and outwardly extending from the outer face of said plate and secured to and connecting said end thrust flanges, laterally inwardly extending integral ears depending from the four corners of said plate member integral side lips outwardly extending from the side edges of said plate between said ears, a cross rib of the same metal composition as said longitudinal ribs, secured to and outwardly projecting from said plate and secured to and connecting said lips and said longitudinal ribs, and means secured to said ears for attaching said plate members to said tire.

4. A non-skid attachment as claimed in claim 3 wherein said longitudinal ribs are curved and oppositely disposed to form substantially the letter X.

References Cited in the file of this patent

UNITED STATES PATENTS

| Number | Name | Date |
|---|---|---|
| 1,436,102 | Hogue | Nov. 21, 1922 |
| 1,438,148 | Vescovi | Dec. 5, 1922 |
| 1,590,944 | Hearttagen | June 29, 1926 |
| 1,626,788 | Crawford | May 3, 1927 |
| 2,066,412 | Meckler | Jan. 5, 1937 |
| 2,616,476 | Gerds | Nov. 4, 1952 |

FOREIGN PATENTS

| Number | Country | Date |
|---|---|---|
| 57,155 | Norway | Oct. 12, 1936 |
| 500,608 | France | Mar. 18, 1920 |